Jan. 16, 1923.
A. H. GREEN.
WEIGHING MACHINE.
FILED JAN. 22, 1921.
1,442,399.
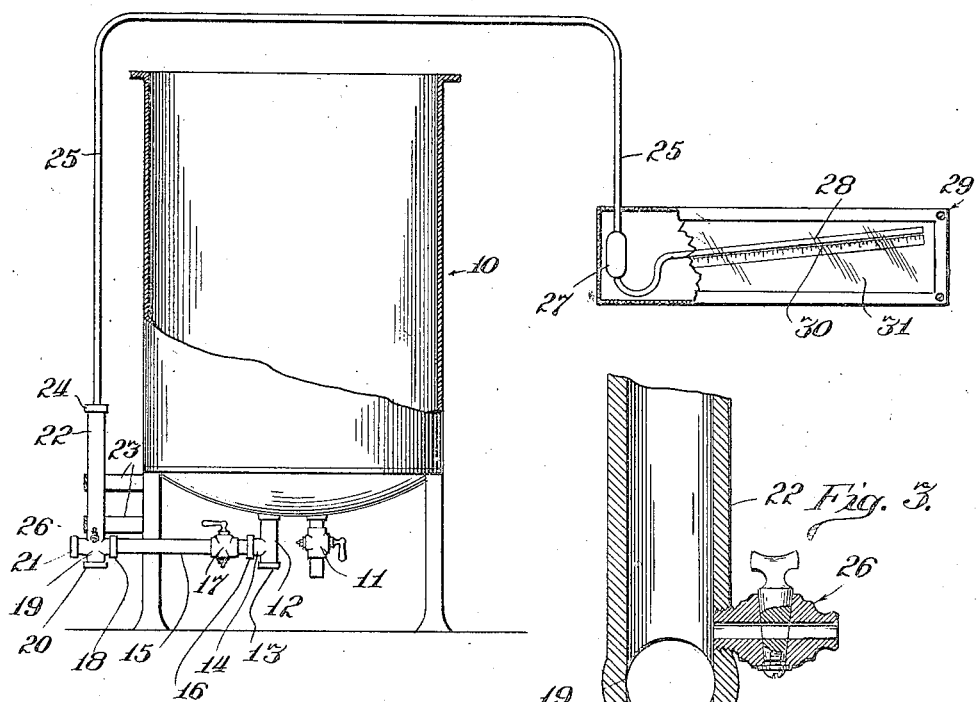
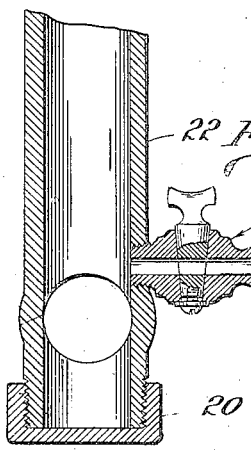
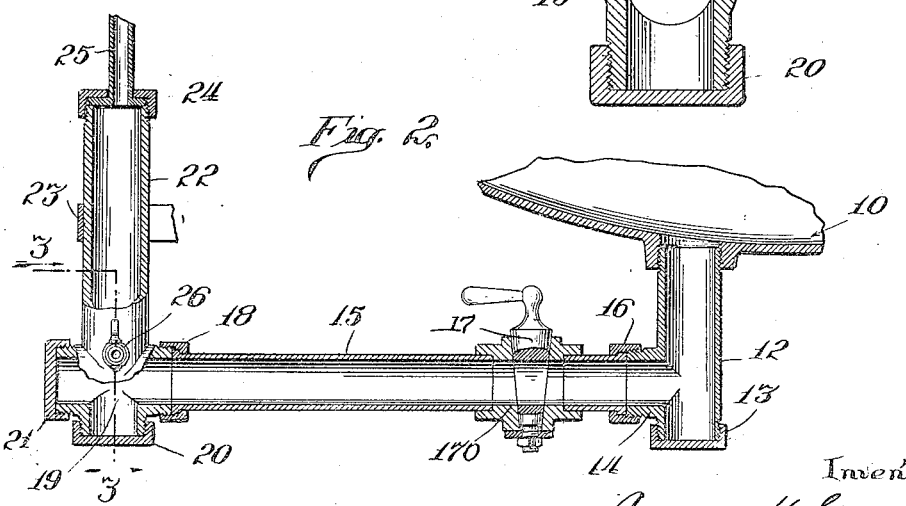
Inventor
Andrew H. Green
By J. McRoberts
his Attorney Patented Jan. 16, 1923.

1,442,399

UNITED STATES PATENT OFFICE.

ANDREW H. GREEN, OF CHICAGO, ILLINOIS, ASSIGNOR TO GREEN GAUGE COMPANY, OF CHICAGO, ILLINOIS, A CORPORATION OF ILLINOIS.

WEIGHING MACHINE.

Application filed January 22, 1921. Serial No. 439,074.

*To all whom it may concern:*

Be it known that I, ANDREW H. GREEN, a citizen of the United States, residing at Chicago, in the county of Cook, State of Illinois, having invented certain new and useful Improvements in Weighing Machines, do hereby declare that the following is a full, clear, and exact description of the same.

My invention provides a device for weighing large quantities of liquid or semi-liquid materials that indicates in sequence without any change or adjustment of parts the weights of one or more such substances, each with the same or a different specific gravity, the resulting total of which gives a compounded whole of predetermined composition and of predetermined weight, and one that is capable of successful use under all conditions where sanitary factors or other considerations require the frequent cleaning or sterilizing of the parts coming in contact with the material, and under all conditions where the physical or chemical nature of the material to be weighed possesses potential possibilities of change when segregated from the main volume in the tank, or under any condition where it is essential that the material shall not remain in any portion of the weighing system for any appreciable length of time; and under conditions of varying external atmospheric temperatures, and also where the material is subject to varying degrees of temperature.

Other objects and advantages will be apparent from the disclosure of the various features and matters hereinafter described.

In the accompanying drawings, Fig. 1 is a view partly in side elevation and partly in section of an apparatus embodying the features of my invention;

Fig. 2 is a detail sectional view of the detachable sanitary pipe fitting shown in Fig. 1; and Fig. 3 is a detail sectional view showing the air-equalizing pet-cock in the pipe fitting, being taken on the line 3—3 in Fig. 2.

In the drawings the reference numeral 10 indicates a tank of suitable capacity to meet the requirements of any particular installation, and its rounded bottom has a discharge pipe provided with a discharge valve 11 which is removable to permit the pipe and valve to be cleaned or sterilized.

In the practice of my invention a pressure-operated weight-indicating gauge is connected by a pipe-line to an opening in the bottom of the tank, and this line is provided with a control-valve and with an air-equalizing device to ensure atmospheric pressure therein, and all of its parts coming into contact with the liquid from the tank constitute a separable pipe-fitting which can be quickly and easily disassembled for cleaning or sterilizing for sanitary purposes. In the form shown this pipe-line is connected to the tank by means of the outlet pipe 12 located at any suitable point in the bottom and provided with a cap 13 and a side outlet 14 to which the pipe 15 is detachably connected by the coupling 16. A control valve 17 is provided, preferably in a threaded socket 170 in the pipe 15, and this pipe at its outer end is detachably connected by a coupling 18 to one of the lateral arms of the union 19, which is in the form of an inverted cross having its lower and outer arms closed by the plugs or caps 20 and 21, and its upper arm 22 prolonged to form a stand-pipe which is rigidly supported on a leg of the tank by brackets 23. The upper end of the stand-pipe is connected by an air-tight joint 24 with one end of a small pipe 25 which leads to the indicating gauge, which may be located at any suitable point.

The pipe-line is provided with an air-equalizer at the bottom of the tank for equalizing the air pressure inside the system with that outside to provide atmospheric conditions in the line by venting or letting out excess air or gas impounded in the stand-pipe or line by the liquid sealing its lower end when the valve 17 is opened, or to equalize changes due to external atmospheric conditions; this ensures initial atmospheric pressure in the air-line and on the gauge so that it will always start at its zero reading or position when the liquid flows into the pipe-line and at any subsequent time an equal or uniform pressure will be obtained in the pipe-line for each weighing operation. This equalizer determines the level in the tank at which the pressure begins and so enables the device to start the measurements of the hydrostatic pressure of liquids in the tank at a fixed point and to establish atmospheric equilibrium at this point at all times during the weighing operations, and as the equalizer is located so that this definite point is at the bottom of the tank the pressure of any quantity of liquid therein is always indicated from the same point. In the exemplification shown, the air-equalizer is in the form of a pet-cock 26 in the stand-pipe, and preferably with the base of its opening level with or tangential to the upper surface of the bore of the pipe 15 as clearly shown in Fig. 3. The pet-cock may be placed higher in the stand-pipe, but it is preferred to locate it as above stated as then the liquid will not enter the pipe 22 above the cock when the latter is opened for the purpose of equalizing the air in the line as hereinafter explained and will not enter this pipe for any considerable distance above the cock when the latter is closed during the weighing operation, so that the necessity of flushing or swabbing out the upper portion of the stand-pipe to clean or sterilize it is obviated. The pet-cock is removable for cleaning or sterilizing.

The gauge is of any suitable type, and in the form shown consists of a suitable mercury chamber 27 which is hermetically connected to the end of the pipe 25 and has a glass side arm or tube 28 which is open at its free end and is set at a suitable inclination to retain the movement of the mercury within its limits. The parts of the gauge are enclosed in a casing 29, and a suitable scale plate 30 is slidably mounted on the casing at one side of and parallel with the tube 28, the casing having a glass panel 31 through which the tube and plate may be observed and which is removable to allow the operator to have access to the plate when calibrating the device. The gauges are made up according to the different sizes of the tanks, and the scale plates are marked to indicate the weight of the liquid in terms of any desired unit.

In using the device the chamber 27 is filled with sufficient mercury so that when it is extended to the full length of the lateral tube there will still be a portion of mercury in the chamber.

The procedure of calibrating the apparatus is carried out as follows:—The tank is empty, the discharge valve 11 and pet-cock 26 are closed, and the control valve 17 is opened, and the pipe system between the tank and the mercury reservoir is consequently full of air; then a carefully weighed unit of water, say 100 pounds, is emptied into the tank. The valve 17 is then shut, pet-cock 26 is opened, and the liquid in the stand-pipe 22 allowed to drain from the pet-cock until its flow ceases, and the pet-cock 26 is then closed and the valve 17 opened. The liquid then seals the lower end of the stand-pipe 22 and the weight of this water will compress the air sealed in the pipe system and force the mercury to a slightly higher mark in the tube of the indicating gauge. The scale plate is then adjusted or marked by the operator to bring its 100 pound mark into position in register with the position of the meniscus of the mercury in the tube 28. When this operation is completed the discharge valve 11 is opened and the caps 13 and 20 removed to drain off the water in the tank and pipes; when the water is discharged the caps are replaced, the valve 11 and pet-cock are closed and the valve 17 is opened, when the apparatus is ready for weighing any liquid entering the tank. After the scale plate is once positioned or calibrated in this manner no further calibrating is required as a uniform volume of air is always present in the air line and each time the vat is emptied the mercury will return to its zero position, so that the process of filling the tank with a liquid, weighing its contents and emptying it can be repeated indefinitely.

The weighing of any liquid is carried out as follows:—After the device is calibrated on any desired unit in the manner above set forth, the discharge valve 11 and pet-cock 26 are closed, and the valve 17 is opened. When a sufficient quantity of liquid has run in the tank to bring the mercury to at least the first reading on the scale, valve 17 is closed and the pet-cock 26 opened allowing the liquid in stand pipe 22 to drain until its flow ceases; the pet-cock 26 is then closed and valve 17 opened. The gauge will then accurately indicate increasing or decreasing amounts or any given amount of liquid in the tank. Should any change in condition take place, such as hereafter described, the above procedure is repeated which will again equalize the pressure and the accurate weight will be indicated.

As the joint 24 is air-tight the air in the system cannot be compressed enough to allow the liquid to rise into pipe 25, so that when weighing is completed the assembled parts may be disconnected and all surfaces with which the liquid has come in contact may be cleaned or sterilized. The couplings 16 and 18 are disconnected, the pipe 15 is detached, and the caps 13, 20 and 21 and the valve 17 and pet-cock 26 are removed, and then all parts that have been in contact with the liquid can be cleaned or sterilized, including the stand-pipe 22 which can be swabbed out, as when the parts are disconnected its entire bottom is removed and opposite clean-out passages are provided by its lateral arms so that all its interior surfaces are readily accessible. The arrangement of the parts so they can be easily detached to be cleaned or sterilized is an advantage in this class of devices where it is necessary to ensure sanitary conditions, such as in the handling of liquid foods. Also, in practice the valve 17 is placed as near the connection 16 as possible; this valve may be shut off thus segregating the small amount of liquid which is present in the weighing system from the mass in the tank, and the segregated portion can be easily and immediately drained by removing the caps 20 and 21, and the stand pipe and its associated parts can be disassembled and cleaned, without disturbing the mass in the tank. This feature is advantageous under conditions where the liquid being treated, if allowed to stand in the exposed pipe system for a considerable length of time, would have a detrimental effect upon the main volume in the tank; for example, it often is necessary to hold for many hours a perishable liquid such as milk in tanks constructed to insure its preservation by high or low temperatures, and the liquid in the unheated or unrefrigerated trap or pipe would be exposed to atmospheric temperature thus allowing bacterial multiplication which would contaminate the mass in the tank; also, in treating melted fats in a heated tank the corresponding isolated portion would solidify at the atmospheric temperature to which it is exposed; and by this feature of my invention the exposed portion can be segregated and removed to eliminate the source of contamination or infection in the first instance and the solidified fats in the second instance.

In order to obtain accurate weights and correct comparisons of successive batches it is essential that a uniform volume of air at atmospheric pressure be present in the weighing system at the start of each weighing operation. In the device shown the use of the petcock ensures and maintains a uniform volume of air in the air-line which includes the stand-pipe, tube 25 and such portion of the mercury chamber as is not filled with mercury. The equalizing operation is as follows:—with the valve 11 and pet-cock 26 closed and the control valve 17 open the liquid is run in the tank, and then the valve 17 is closed and the pet-cock opened to allow the liquid to run out the stand-pipe until it uncovers the cock or ceases to run, thereby opening the air-line to the outside air and producing atmospheric pressure on both ends of the mercury column; as soon as this is accomplished, for example when the liquid ceases to flow out of the pet-cock, the latter is closed and the valve 17 is opened to allow the liquid to be weighed to act upon the air-line and operate the gauge. In case there is not enough liquid in the tank to compress the air in the air-line enough to bring the level of the liquid up to the pet-cock the operator will open both the valve 17 and the pet-cock 26 and leave them open until the liquid flows out of the latter when he will close the valve 17 and allow any liquid above the pet-cock to drain off until the air-line is open to the atmosphere, and then the pet-cock is closed and the valve 17 is opened to allow the liquid to be weighed to act on the gauge. The equalizing of the air pressure inside the system with that outside will take place before each batch is weighed, and may be done after the batch is run into the tank or while it is either running in or out, thus ensuring an accurate weight at any given time during the operation. This always ensures initial atmospheric pressure in the weighing system. This condition is essential where any part of the device is subjected to varying external temperatures or atmospheric conditions, or where there are variations in the temperature of the liquid being weighed, or any condition where the properties of the liquid would tend to cause discrepancies in the pressure of the confined air or gas. As the joint 24 is air-tight there can be no escape of air when the apparatus is operating, there is uniform air pressure in the air-line and consequently uniform indications on the gauge, and as the pet-cock is located at the level of the bottom of the tank it will be sealed by the liquid and if there is any leak in the pet-cock or in the pipe connections between the stand-pipe and tank it is merely a liquid leakage which is unimportant and does not affect the air pressure or the accuracy of the device, and so the apparatus is fool-proof even if the workmen are careless in assembling the detachable piping.

Various changes in details of construction of the parts may be made without departing from the scope of my invention. The apparatus will weigh liquids irrespective of variations in the specific gravity of the whole or any portion thereof without any change or adjustment of parts or any readjustment of the specific gravity of the indicating liquid in the gauge, and when it is once calibrated it will automatically give the weights of the different liquid contents of the tank for an indefinite time as it does not require recalibrating, and its accuracy is not affected by any changes or variations in the temperature of the liquids being weighed, or by extremes of temperature in the plant or to which any part of the apparatus may be subjected as from that of steam to below freezing. Further, the separable pipe-connections can be disconnected and disassembled for cleaning or sterilizing the parts that have been in contact with the liquid, and can be reassembled by unskilled labor without affecting the calibration of the gauge or its accuracy in subsequent weighing operations.

The present application is a continuation in part of my pending application filed June 9, 1920, Serial Number 387,534.

I claim:

1. In a device for indicating the weights of liquids, a tank having an outlet in its bottom, a weight-indicating pressure gauge, a pipe line between the gauge and tank outlet, a valve controlling the passage into the pipe line, and means beyond the valve to vent the pipe line to provide atmospheric pressure in the air therein above the liquid therein.

2. In a device for indicating the weights of liquids, a tank having an outlet in its bottom, a stand pipe connected to the outlet, a valve controlling the passage into the stand pipe, a weight-indicating pressure gauge, a pipe-line between the gauge and stand pipe, and a vent-cock in the lower end of the stand pipe to provide atmospheric pressure in the pipe line above the liquid in the stand pipe.

3. In a device for indicating the weights of liquids, a tank having an outlet in its bottom, a stand pipe, a weight-indicating pressure gauge, a pipe line between the gauge and stand pipe, a pipe connecting the stand pipe and tank outlet, a control valve in said connecting pipe adjacent the tank outlet, and a vent-cock in the stand pipe tangential to the top of the inlet of the connecting pipe.

4. In a device for indicating the weights of liquids, a tank having a lower outlet, a stand pipe, a weight-indicating pressure gauge, a pipe line between the gauge and stand pipe, and a detachable pipe-fitting between the stand pipe and tank outlet comprising a removable pipe having a removable control valve adjacent the tank outlet and connections for disassembling the parts coming in contact with the liquid.

5. In a device for indicating the weights of liquids, a tank having a lower outlet, a stand pipe, a weight-indicating pressure gauge, a pipe line between the gauge and stand pipe, a detachable pipe between the stand pipe and tank outlet, a detachable vent-cock near the lower end of the stand pipe, and a detachable valve in the detachable pipe, the latter pipe, its valve, the stand pipe and the cock being constructed to be disassembled and afford access to the parts coming in contact with the liquid.

6. In a device for indicating the weights of liquids, a tank having a lower outlet, a weight-indicating gauge, a pipe line between the gauge and tank outlet including a stand pipe having clean-outs, a detachable vent cock in the stand pipe, an air pipe between the stand pipe and gauge, a removable pipe connected to the stand pipe and tank outlet by detachable couplings to disassemble the parts, and a removable valve in said pipe.

7. In a device for indicating the weights of liquids, a tank having an outlet pipe, a cap for the pipe, a stand pipe having a cap at its lower end, a weight-indicating pressure gauge, a pipe line between the gauge and stand pipe, a detachable pipe connecting the stand pipe and outlet pipe, a control valve detachably mounted in the detachable pipe adjacent the tank outlet, and a vent-cock detachably mounted in the stand pipe.

8. In a device for indicating the weights of liquids, a tank having an outlet in its bottom, a weight-indicating gauge, a pipe line between the gauge and tank outlet, a valve adjacent the tank outlet to segregate the pipe line from the tank, and means to drain the liquid from the segregated line.

9. In a device for indicating the weights of liquids, a tank, a stand-pipe, a pipe between the stand pipe and tank, a gauge having a liquid chamber and a side arm open at its free end, an air line having one end connected to the chamber and its other end connected to the stand pipe, a control valve in the pipe between the tank and stand-pipe, and a removable cap at the bottom of the stand-pipe to drain the liquid segregated by the valve from the mass in the tank.

10. In a device for indicating the weights of liquids, a tank, a stand-pipe consisting of a vertical pipe having an open bottom and opposite side outlets, a pipe connecting one of the outlets to the bottom of the tank, a gauge having a liquid chamber and a side arm open at its free end, an air line having one end connected to the chamber and its other end connected to the top of the stand-pipe, removable caps closing the other side outlet and bottom of the stand-pipe, a removable vent-cock located in the stand-pipe at the bottom thereof, and a removable control valve in the pipe between the tank and stand-pipe.

ANDREW H. GREEN.